United States Patent
Koonen

(10) Patent No.: US 11,668,876 B2
(45) Date of Patent: Jun. 6, 2023

(54) TWO-DIMENSIONAL OPTICAL BEAM STEERING MODULE

(71) Applicant: Technische Universiteit Eindhoven, Eindhoven (NL)

(72) Inventor: Antonius Marcellus Jozef Koonen, Nuenen (NL)

(73) Assignee: Technische Universiteit Eindhoven, Eindhoven (NL)

( * ) Notice: Subject to any disclaimer, the term of this patent is extended or adjusted under 35 U.S.C. 154(b) by 268 days.

(21) Appl. No.: 16/464,358

(22) PCT Filed: Nov. 28, 2017

(86) PCT No.: PCT/EP2017/080716
§ 371 (c)(1),
(2) Date: May 28, 2019

(87) PCT Pub. No.: WO2018/099927
PCT Pub. Date: Jun. 7, 2018

(65) Prior Publication Data
US 2021/0109286 A1    Apr. 15, 2021

Related U.S. Application Data

(60) Provisional application No. 62/427,646, filed on Nov. 29, 2016.

(51) Int. Cl.
*G02B 6/293*   (2006.01)
*G02F 1/313*   (2006.01)

(52) U.S. Cl.
CPC ..... *G02B 6/29325* (2013.01); *G02B 6/29395* (2013.01); *G02F 1/3131* (2013.01)

(58) Field of Classification Search
None
See application file for complete search history.

(56) References Cited

U.S. PATENT DOCUMENTS 9,246,589 B2    1/2016 Koonen et al.
2008/0138077 A1   6/2008 Stretton
(Continued)

FOREIGN PATENT DOCUMENTS

CN    1224849 A    8/1999
CN    1529188 A    9/2004
(Continued)

OTHER PUBLICATIONS

Khalid et al., 10 Gbps Indoor Optical Wireless Communication Employing 2D Passive Beam Steering based on Arrayed Waveguide Gratings (Date Added to IEEE Xplore: Aug. 25, 2016).

*Primary Examiner* — Chad H Smith
(74) *Attorney, Agent, or Firm* — Lumen Patent Firm

(57) ABSTRACT

An optical beam steering device is provided that includes an input optical fiber carrying multiple input optical signals, where each input optical signal includes a unique wavelength, an arrayed waveguide grating router (AWGR) having multiple output fibers, where the input optical fiber is connected to the AWGR, distal ends of the output fibers are arranged in a two-dimensional fiber array, the input optical signals are routed by the AWGR according to each unique wavelength to a unique AWGR output fiber, and a lens, where the distal ends of the output fibers are disposed proximal to a focal plane of the lens, where for each unique position of each output fiber distal end with respect to a the lens, each input optical signal is steered at a unique angle as an output beam emitted from the lens, where changing the wavelength of the input optical signal changes the output signal angles.

2 Claims, 8 Drawing Sheets

(56) References Cited

U.S. PATENT DOCUMENTS

2011/0228374 A1    9/2011   Ooba
2013/0108205 A1    5/2013   Oguri

FOREIGN PATENT DOCUMENTS

| CN | 103759668 | * | 1/2014 | ............ G01B 11/24 |
| CN | 103759668 A | | 4/2014 | |
| WO | WO2003098961 | | 11/2003 | |

* cited by examiner

US 11,668,876 B2

TWO-DIMENSIONAL OPTICAL BEAM STEERING MODULE

CROSS-REFERENCE TO RELATED APPLICATIONS

This application is a 371 of PCT application PCT/EP2017/080716 filed Nov. 28, 2017. PCT application PCT/EP2017/080716 claims the benefit of U.S. Provisional application 62/427,646 filed Nov. 29, 2016.

FIELD OF THE INVENTION

The present invention relates generally to optical wireless communication. More particularly, the invention provides two-dimensional steering of optical beams by means of an arrayed waveguide grating device integrated with fiber pigtails, where the outgoing fibers are arranged in a well-designed 2D matrix followed by a lens.

BACKGROUND OF THE INVENTION

Optical wireless communication (OWC) is receiving interest not only from academia, but increasingly also from industry. It offers a powerful solution for creating high-capacity wireless connectivity while not compromising the already overcrowded radio spectrum. E.g., it is a powerful alternative for fronthaul connections from the baseband units (BBUs) to the remote radio head (RRH) antenna stations in the upcoming 5G wireless networks which should offer 1000× more capacity at 100× less power consumption than current 4G networks, with <1 ms latency. The unbeatable bandwidth of the optical beams used in OWC provides the unique opportunity to meet these challenges, while in addition offering improved security (as tapping a beam is nearly impossible, and these OWC links do not penetrate walls) and reliable connections (as OWC links are not bothered by electromagnetic interference (EMI) from radio sources, nor generate EMI).

SUMMARY OF THE INVENTION

To address the needs in the art, an optical beam steering device is provided that includes an input optical fiber carrying multiple input optical signals, where each input optical signal includes a unique wavelength, an arrayed waveguide grating router (AWGR) having multiple output fibers, where the input optical fiber is connected to the AWGR, where distal ends of the multiple output fibers are arranged in a two-dimensional fiber array, where the multiple input optical signals are routed by the AWGR according to each unique wavelength to a unique AWGR output fiber in the two-dimensional fiber array, and a lens, where the distal ends of the output fibers are disposed proximal to a focal plane of the lens, where for each unique position of each output fiber distal end with respect to a the lens, each input optical signal is steered at a unique angle as an output beam emitted from the lens, where changing the wavelength of the input optical signal changes the output signal angles for two-dimensional beam steering.

In another aspect of the invention, the two-dimensional fiber array is configured for scanning with discrete steps in both two-dimensional angular directions when the input optical signal wavelength is varied.

In yet another aspect of the invention, a profile of the output beam includes a collimated beam, or a diverging beam, where the output beam profile is according to a positioning of the output fiber ends with respect to the focal plane of the lens.

DETAILED DESCRIPTION

The current invention provides two-dimensional steering of optical beams by use of an arrayed waveguide grating router (AWGR) device, which is an integrated device with fiber pigtails, where the outgoing fibers are arranged in a well-designed 2D matrix followed by a lens. 2D steering is enabled by tuning the wavelength of the optical signal fed into the arrayed waveguide grating. Multiple beams can be emitted simultaneously and each be independently steered by tuning the wavelength of each signal.

Figure 1:
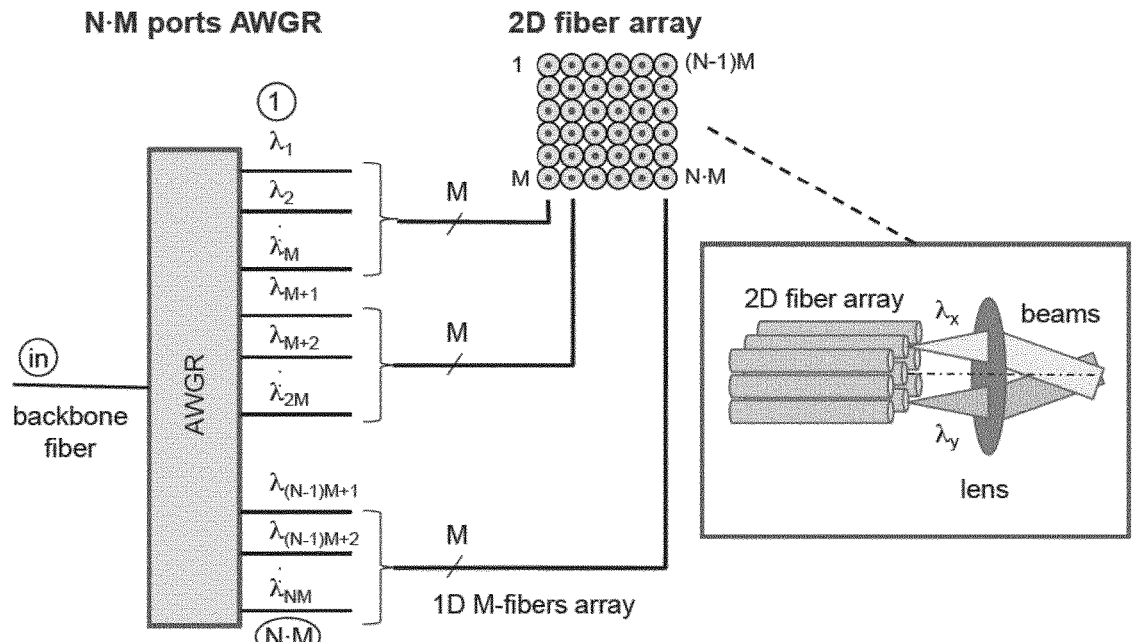
FIG. 1 shows 2D steering of IR beams using a high port-count AWGR, according to one embodiment of the invention.

According to one embodiment, a 2D beam steering device is shown in FIG. 1. The backbone fiber is feeding the multiple optical signals carrying the high-speed data into the AWGR, where each signal has a different specific wavelength. As indicated, the AWGR has many output fibers, and according to the wavelength filtering characteristics of the AWGR, the wavelength of each input signal determines to which specific output fiber this signal will go. The output fibers are arranged in a two-dimensional matrix structure (indicated as 2D fiber array). This array is put in the focal plane of a lens. Thus, depending on the position of a fiber with respect to the lens, the optical signal out of that fiber will be steered as a collimated beam emitted by the lens under a certain angle. By changing the wavelength of the optical signal, that signal will emerge out of another fiber, and thus be emitted by the lens under another angle. The 2D fiber matrix structure will thus yield the two-dimensional beam steering.

The current invention provides scanning with discrete steps in both the 2D angular directions when the wavelength is varied. The module with two cross-aligned gratings provides continuous scanning in one angular direction, and discrete scanning in the orthogonal angular direction. The emitted optical beams provide full coverage of the target area which can be reached by both the module according to the current invention and by the module with two cross-aligned gratings according to the previous invention (U.S. Pat. No. 9,246,589, which is incorporated by reference herein in its entirety).

Figure 2:
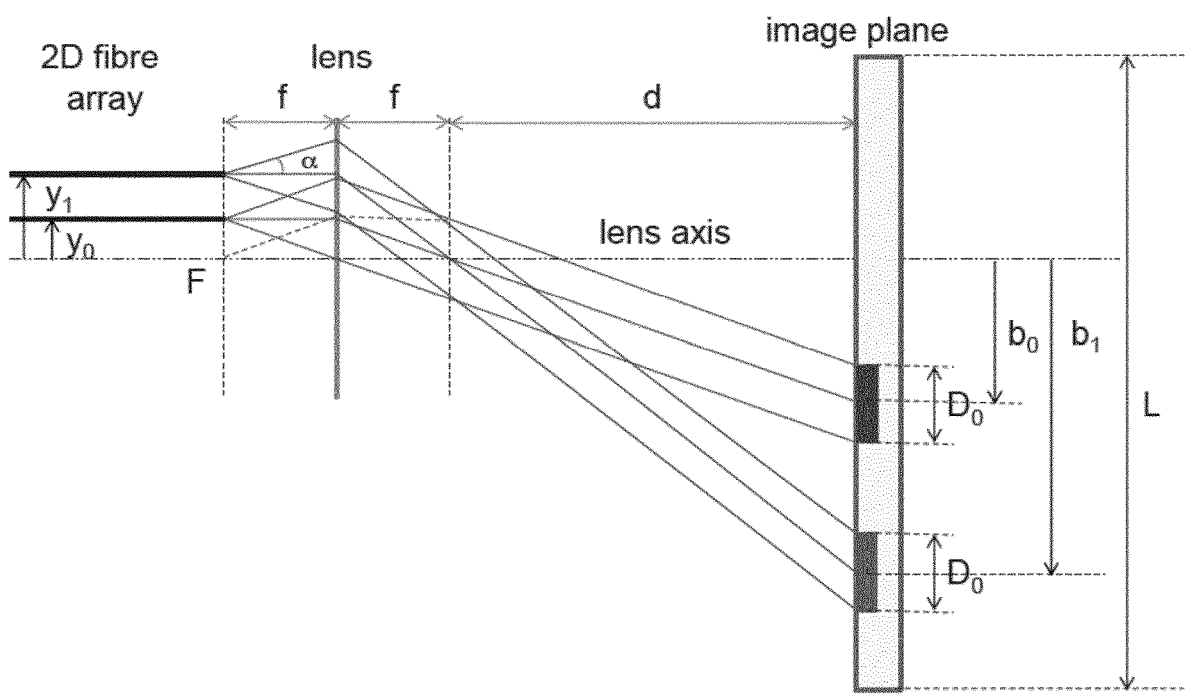
FIG. 2 shows a design of AWGR-based 2D beam steering module using collimated beams, according to one embodiment of the invention.

The area covered by the beam steering can be derived from the spacing $\Delta y$ of the fibers in the 2D fiber array and the focal length f of the lens. Each beam will create a spot with a diameter $D_{spot}$ in the image plane. The maximum allowable spot size is dictated by the aperture of the optical wireless communications (OWC) receiver, and the minimum amount of received power needed for the data rate to be reliably transferred. As shown in FIG. 2, given that the image area of size L×L needs to be fully covered by the beam spots (so the various spots should be directly adjacent to each other, touching each other without any room in between) and given a certain number $M^2$ of output ports of the AWGR, the spot size $D_{spot}$, the spacing of the fibers $\Delta y$ and the lens focal length f can be calculated as $$D_{spot} = \frac{L}{M} = 2f\tan\alpha \qquad \text{eq. (1)}$$

$$\Delta y = \frac{L^2}{2dM^2\tan\alpha} = \frac{\pi w_0}{2d\lambda}\left(\frac{L}{M}\right)^2$$

$$f = \frac{L}{2M\tan\alpha} = \frac{\pi w_0 L}{2\lambda M}$$

where tan α is the half emission angle with which the light is radiated by an output fiber of the AWGR. For single-mode fiber (SMF) in the λ=1.5 µm wavelength range, typically tan α=λ/(π·w₀)≈0.1 where w₀ is the SMF's beam waist.

For typical commercially available AWGRs, this commonly leads to a quite bulky module, e.g., with an AWGR having 80 output ports M=9, in order to cover an area of only 0.75×0.75 m² (so L=0.75 m), a large condenser lens is needed with f=39.3 cm and diameter $D_{lens}$=21 cm, and a fiber spacing Δy=15.5 mm which yields a 2D fiber array total size of 12.4×12.4 cm².

Figure 3:
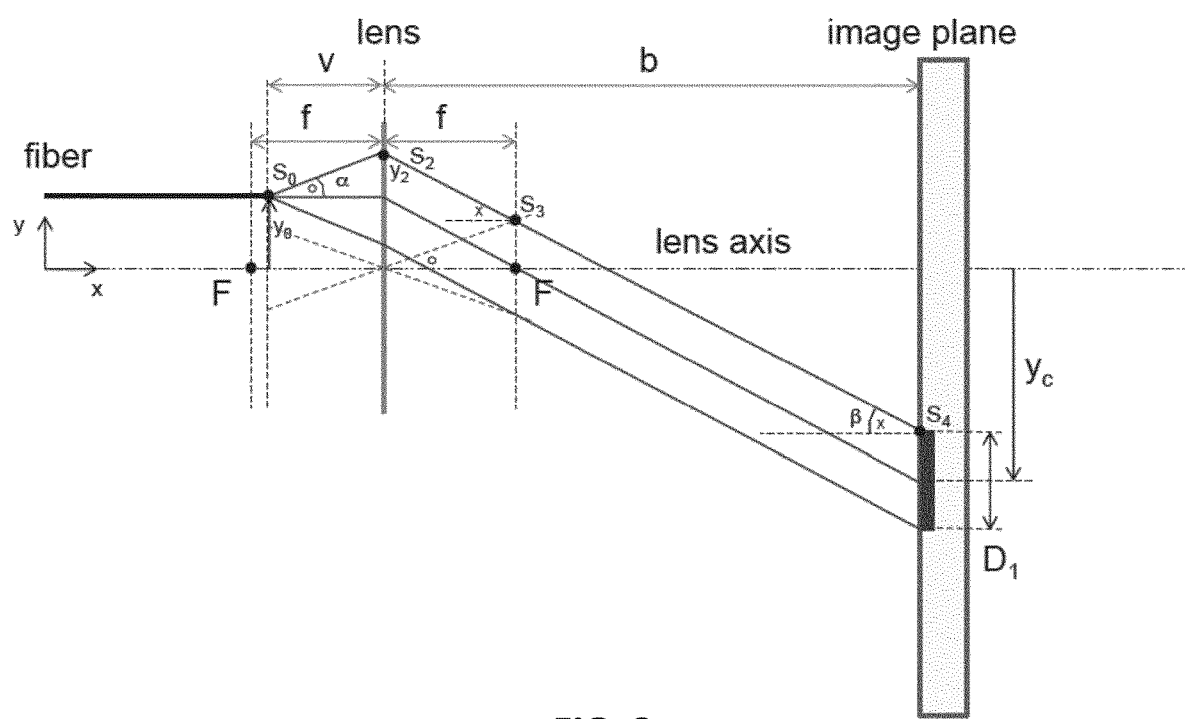
FIG. 3 shows reducing of the size of the AWGR-based 2D beam steering module by applying defocusing, according to one embodiment of the invention.

To circumvent this bulkiness, the current invention employs defocusing for the module. The layout of the defocused module is actually the same as in FIG. 1, but now the fiber array is not put in the focal plane of the lens, but somewhat closer, at a distance v=(1−p)·f from the lens' principal plane, where the defocusing parameter p satisfies 0≤p<1; see FIG. 3. Note that p=0 yields a module without defocusing, i.e. the module according to FIG. 2. As a result of the defocusing, the beam after the lens is not collimated anymore, but is slightly diverging. Thus the diameter of the beam spot in the image area $D_{spot}$ gets larger; so alternatively, given a certain area to be covered, the lens focal length f and the lens diameter $D_{lens}$ can be reduced. This beam spot diameter $D_{spot}$ is independent on the output fiber position, and can be derived to be $$D_{spot}=2\tan\alpha\cdot(f+p(b-f)) \qquad \text{eq. (2)}$$

As b>f, increasing the defocusing p therefore implies a larger spot diameter $D_{spot}$.

Figure 4A:
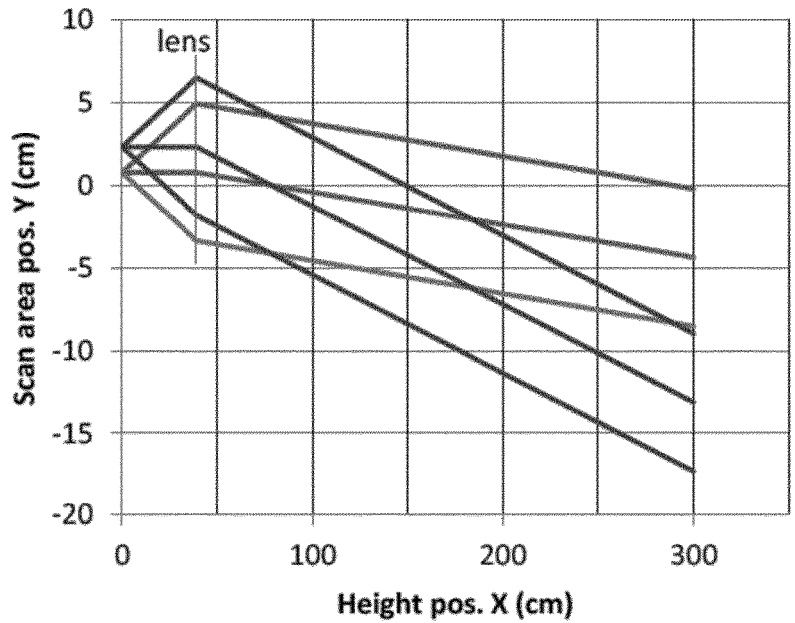
FIGS. 4A-4B show paraxial ray tracing for (4A) no defocusing (p=0), and (4B) defocusing with p=0.12, according to one embodiment of the invention.
Figure 4B:
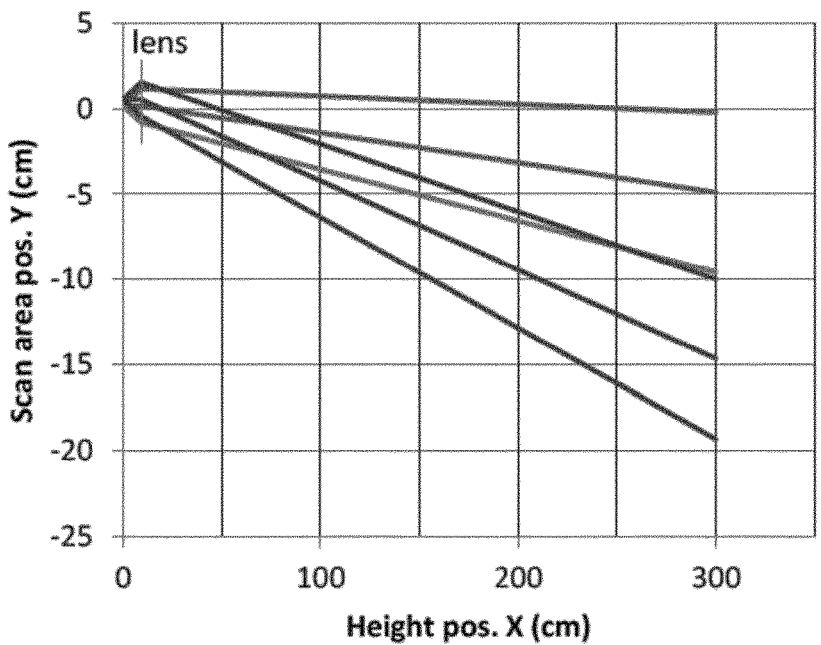

Applying a fractional defocusing parameter p (with 0≤p<1; p=0 means no defocusing, so the case shown in FIG. 2), a considerable reduction of the module's size is achieved. It can be derived that the lens focal length f, fiber spacing Δy and lens diameter $D_{lens}$ needed are $$f = \frac{1}{1-p}\left(\frac{L}{M\cdot 2\tan\alpha} - p\cdot b\right) \qquad \text{eq. (3)}$$

$$|\Delta y_0| = 2f\tan\alpha\left(\frac{f}{b-f}+p\right) = \frac{L}{M}\cdot\frac{L-pbM\cdot 2\tan\alpha}{-L+bM\cdot 2\tan\alpha}$$

$$D_{lens} = (M-1)|\Delta y_0| + 2f(1-p)\tan\alpha$$

where b is the distance between the lens and the image plane (i.e. the area to be covered by the beam steering). FIG. 4 shows the paraxial ray tracing results in case of no defocusing (p=0, so with collimated beams) and defocusing (p=0.12, so with diverging beams). Note that the system parameters have been set according to equation (2) above, such that the spots in the coverage area stay touching each other without intermediate space, in order to keep the full coverage of the image area.

Figure 5:
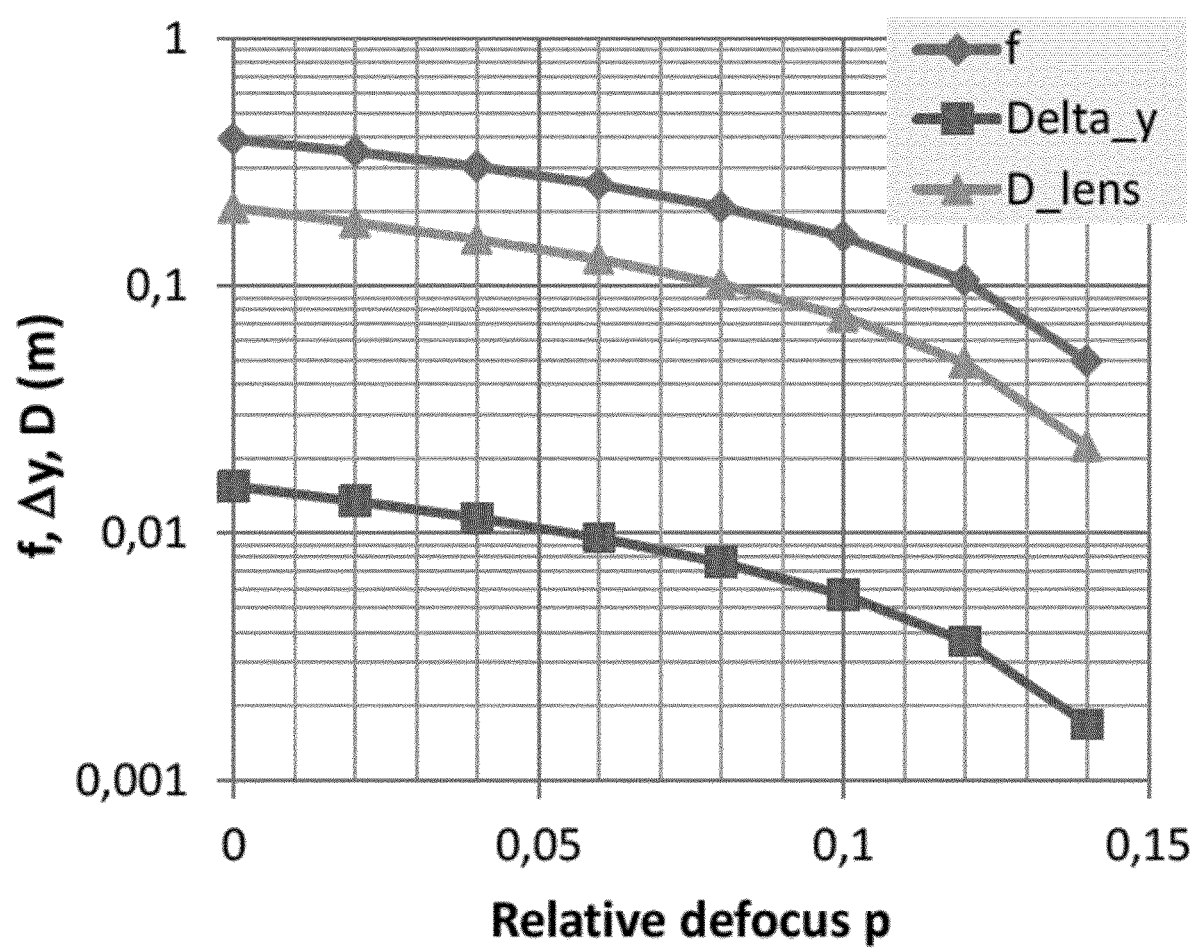
FIG. 5 shows reducing of the module size by defocusing, when applying AWGR with 80 ports (M=9) and spot size $D_{spot}$=8.3 cm, according to one embodiment of the invention.

FIG. 5 shows how the size of the 2D beam steering module can be reduced (in terms of reduction of the lens focal length f, its diameter $D_{lens}$, and the fiber spacing Δy), by increasing the defocusing parameter p. The results have been calculated for a spot diameter $D_{spot}$=8.3 cm (with which reliable transmission of more than 10 Gbit/s per beam has been achieved), a distance b=2.5 m (a typical indoor OWC working distance when the beam steering module is mounted on the ceiling of a room in a building), a coverage area 0.75×0.75 m² (so L=0.75 m), and an AWGR with 80 output ports (so M=9), similar as before. Note that compared to the case with collimated beams (p=0) above where f=39.3 cm, $D_{lens}$=21 cm, and Δy=15.5 mm, with a defocusing of p=0.12 giving f=10.53 cm, Δy=3.67 mm, $D_{lens}$=4.90 cm. This illustrates the significant size reduction of the 2D beam steering module, which can be achieved with the proposed defocusing method.

Figure 6:
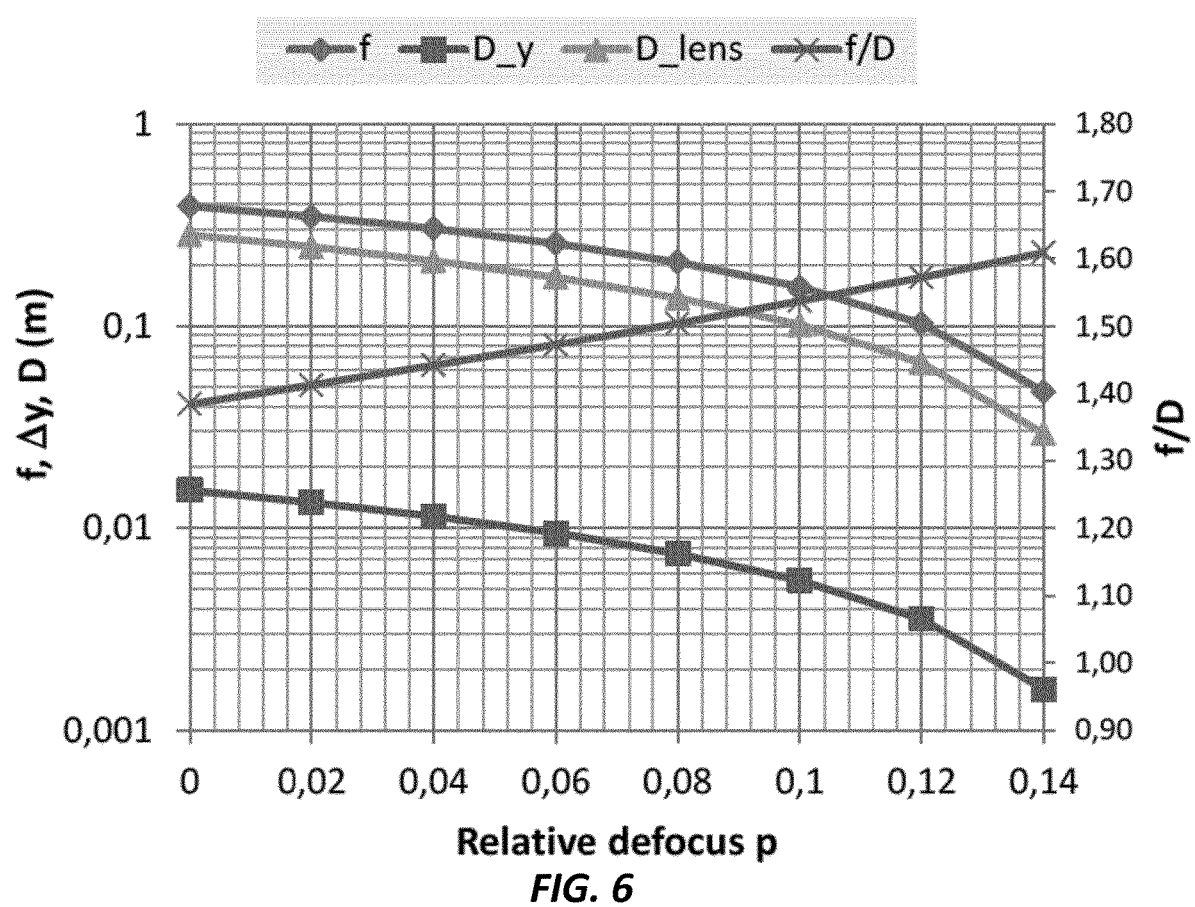
FIG. 6 shows reducing of the module size by defocusing, when applying AWGR with 196 ports (M=14) and $D_{spot}$=8.3 cm, according to one embodiment of the invention.

The current invention can be extended to an AWGR with a larger port count. AWGR-s having 96 output ports are available for the C-band (wavelength range λ=1530 to 1565 nm), and also for the L-band (λ=1565 to 1625 nm). By putting such AWGR-s in parallel, an equivalent AWGR with 192 output ports is obtained for operation over the C+L bands (λ=1530 to 1625 nm). Deploying such a high-port-count AWGR yields M=14, and assuming the same acceptable beam size $D_{spot}$=8.3 cm, the coverage area is increased to 1.16×1.16 m² (as L=M·$D_{spot}$=1.16 m). As shown in FIG. 6 with e.g. a defocusing of p=0.139 the required lens focal length is f=49.9 mm, fiber spacing Δy=1.69 mm, and lens diameter $D_{lens}$=3.11 cm. The f-number of the lens is then f/$D_{lens}$=1.607, which is a realistic number for e.g. well-established 50 mm camera lenses.

Figure 7:
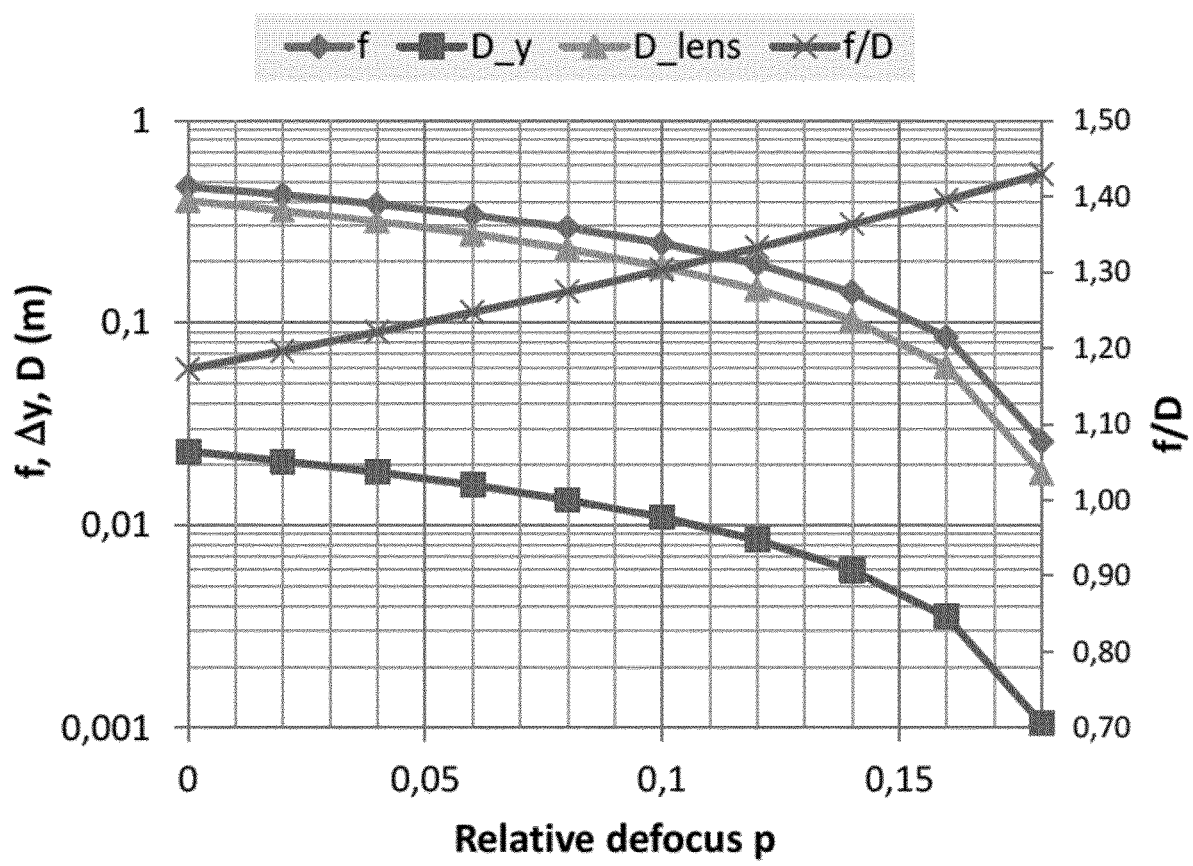
FIG. 7 shows reducing of the module size by defocusing, when applying AWGR with 196 ports (M=14) and $D_{spot}$=10 cm, according to one embodiment of the invention.

In system experiments for the current invention, 20 Gbit/s OWC data transfer was successfully achieved with binary on-off modulated light using a spot size $D_{spot}$=8.3 cm. The measurements indicated that the spot size could be increased further to 10 cm, even 12 cm without loosing significantly on performance. FIG. 7 shows the system's design parameters for a spot size $D_{spot}$=10.0 cm. With a defocusing p=0.172 the required lens focal length is f=49.8 mm, fiber spacing Δy=2.03 mm, and lens diameter $D_{lens}$=3.52 cm. The f-number of the lens is then f/$D_{lens}$=1.42, which is a demanding but still realistic and available number for well-established 50 mm camera lenses. The coverage area can thus be further increased to 1.4×1.4 m².

Further increasing the allowable spot size $D_{spot}$ will also increase the coverage area further, but in addition makes the required f-number ever higher. This makes the lens harder to realize, and hence (significantly) more expensive. E.g., for $D_{spot}$=12 cm, a p=0.21 is needed for f=51.2 mm, $\Delta y$=2.51 mm, $D_{lens}$=4.12 cm, implying an f-number f/$D_{lens}$=1.24, which leads to a quite complex and expensive lens design.

The current invention provides ease of assembly and improved stability as the wavelength-dependent functions are done by an integrated optical circuit. The 2D beam steering by the alternative module is slightly different from the steering by the two cross-aligned diffraction gratings module as described in U.S. Pat. No. 9,246,589. In the alternative one, the steered beam follows discrete steps in both the two angular directions when the wavelength is varied, whereas in the latter one the steered beam is continuous in one angular direction, but takes discrete steps in the orthogonal angular direction. With a well-designed beam, full coverage of the target area can be achieved with either module.

Figure 8A:
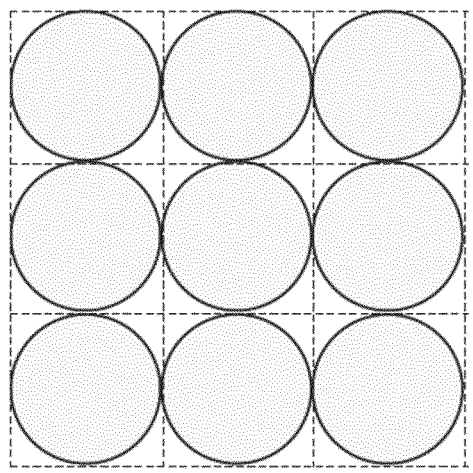
FIGS. 8A-8C show area filling by beam spots, where (8A) shows no spacing between spots (D=Δ), (8B) shows spacing between spots (D≤Δ), (8C) overlap between spots (D>Δ), according to embodiments of the invention.
Figure 8B:
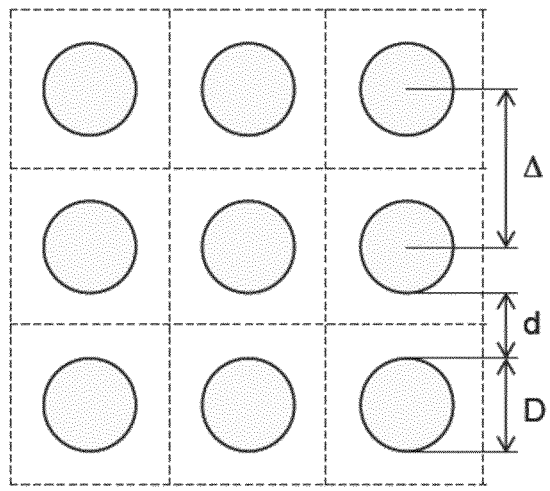
Figure 8C:
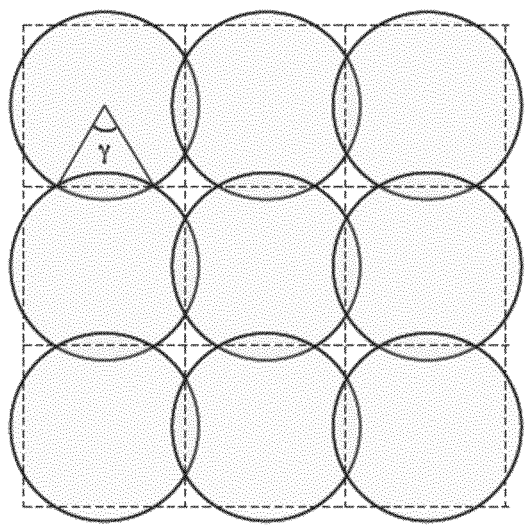
Figure 9:
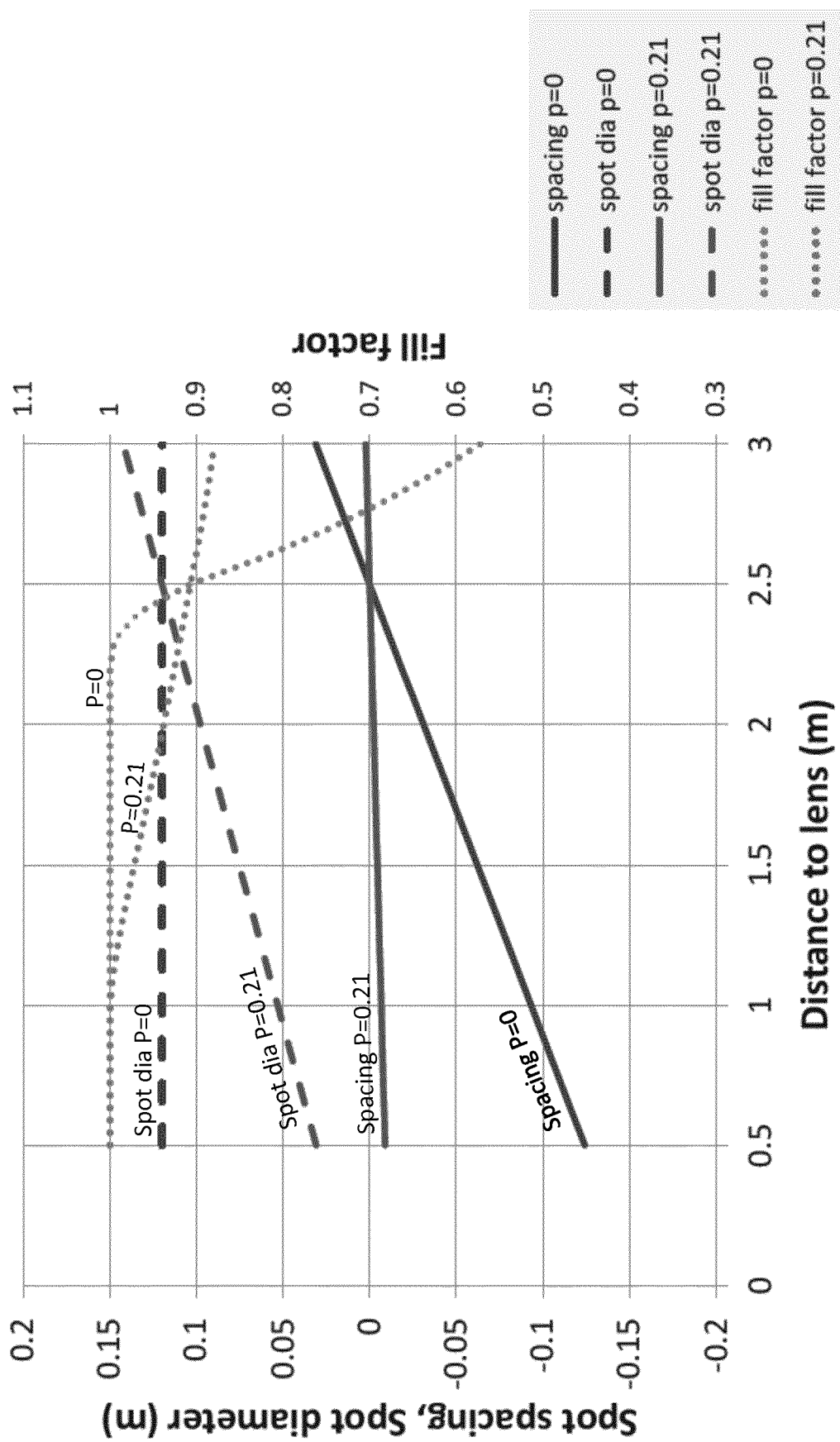
FIG. 9 shows a graph of the improvements in the area fill factor by defocusing, according to the current invention.

Another advantage of the defocusing approach is a better fill factor of the covered area. When adopting the lens focal length f and fiber spacing $\Delta y$ calculated for the image plane distance $b_0$, the spots will exactly touch each other in the image plane (see FIG. 8A, where the $e^{-2}$ intensity contours of the Gaussian spot footprints are shown). When the image plane is moved to a larger distance from the lens (so b>$b_0$), the spacing between the spot centers $\Delta y_c$ increases ($\Delta y_c = \Delta y \cdot$ (b/f−1)). Without defocusing (i.e. p=0), the spot diameter $D_{spot}$ stays constant and becomes smaller than the spot spacing $\Delta y_c$, hence the fill factor decreases when b increases (see FIG. 8B). For b<$b_0$, overlap between the spots occurs (see FIG. 8C). FIG. 9 shows how the spot diameter, the spacing between the spots, and the fill factor (i.e. the summation of the footprint areas of all spots divided by the total coverage area) evolve when the distance b of the image plane to the lens is increased, both for the collimated-beams case (p=0) and the defocused case (p=0.21), for the design where $D_{spot}$=12 cm at room height $b_0$=2.5 m, and M=196 ports. Clearly the defocusing has reduced the dependency of the fill factor on the distance b to the lens.

According to this invention disclosure, a compact and stable 2D optical beam steering module can be achieved by the proposed concept based on a high fiber-port count optically integrated AWGR followed by a lens including proper defocusing of the 2D fiber matrix.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. An optical beam steering device, comprising:
   a) an input optical fiber carrying multiple input optical signals, wherein each of said multiple input optical signals comprises a unique wavelength;
   b) an arrayed waveguide grating router (AWGR) having multiple output fibers, wherein said input optical fiber is connected to said AWGR, wherein distal ends of said multiple output fibers are arranged in an N×M two-dimensional fiber array where N>1 and M>1, wherein each of said multiple input optical signals is routed by said AWGR according to said unique wavelength to a unique one of said multiple output fibers in said two-dimensional fiber array; and
   c) a lens, wherein said distal ends of said multiple output fibers are disposed proximal to a focal plane of said lens, wherein for each unique position of each of said distal ends with respect to said lens, each of said multiple input optical signals is steered at a unique angle as an output beam emitted from said lens, wherein changing said unique wavelength changes said unique angle for two-dimensional beam steering; wherein a profile of said output beam comprises a diverging beam, wherein said output beam profile is adjusted according to a positioning of said output fiber ends with respect to said focal plane of said lens.

2. The optical beam steering device of claim 1, wherein said two-dimensional fiber array is configured for scanning with discrete steps in both two dimensional angular directions when said unique wavelength is varied.

* * * * *